No. 651,284. Patented June 5, 1900.
J. WEST.
MACHINE FOR MAKING SPECTACLE FRAMES.
(Application filed May 9, 1899.)
(No Model.) 10 Sheets—Sheet 1.

No. 651,284. Patented June 5, 1900.
J. WEST.
MACHINE FOR MAKING SPECTACLE FRAMES.
(Application filed May 9, 1899.)
(No Model.) 10 Sheets—Sheet 2.

No. 651,284. Patented June 5, 1900.
J. WEST.
MACHINE FOR MAKING SPECTACLE FRAMES.
(Application filed May 9, 1899.)
(No Model.) 10 Sheets—Sheet 3.

No. 651,284. Patented June 5, 1900.
J. WEST.
MACHINE FOR MAKING SPECTACLE FRAMES.
(Application filed May 9, 1899.)
(No Model.) 10 Sheets—Sheet 5.

No. 651,284. Patented June 5, 1900.
J. WEST.
MACHINE FOR MAKING SPECTACLE FRAMES.
(Application filed May 9, 1899.)
(No Model.) 10 Sheets—Sheet 6.

No. 651,284. Patented June 5, 1900.
J. WEST.
MACHINE FOR MAKING SPECTACLE FRAMES.
(Application filed May 9, 1899.)
(No Model.) 10 Sheets—Sheet 8.

J. WEST.
MACHINE FOR MAKING SPECTACLE FRAMES.
(Application filed May 9, 1899.)

Patented June 5, 1900.

(No Model.)

UNITED STATES PATENT OFFICE.

JAMES WEST, OF LONDON, ENGLAND.

MACHINE FOR MAKING SPECTACLE-FRAMES.

SPECIFICATION forming part of Letters Patent No. 651,284, dated June 5, 1900.

Application filed May 9, 1899. Serial No. 716,166. (No model.)

*To all whom it may concern:*

Be it known that I, JAMES WEST, a subject of the Queen of Great Britain, residing at Stamford Works, Stamford road, Dalston, London, in the county of Middlesex, England, have invented certain new and useful Improvements in Machines for Making Frames of Spectacles and Eyeglasses; and I do hereby declare the following to be a full, clear, and exact description of the invention, such as will enable others skilled in the art to which it appertains to make and use the same.

My invention relates to improvements in machines for making the frames of spectacles and eyeglasses in which magnifying or other lenses are held.

The objects of my improvements are to provide a machine such as will make the frames of spectacles and eyeglasses of a single piece of metal without the aid of brazed joints and to cut and shape such single piece of metal automatically from a bar rolled to a suitable section of steel or other metal. I attain these objects in the manner and by the mechanism illustrated in the accompanying drawings, in which—

Fig. 14 shows a front view of the machine by which the part to form the spectacle-frame is automatically cut and shaped from a steel bar. Fig. 17 is an end view of the same machine.

Similar letters and figures refer to similar parts throughout the several views.

Figure 1:
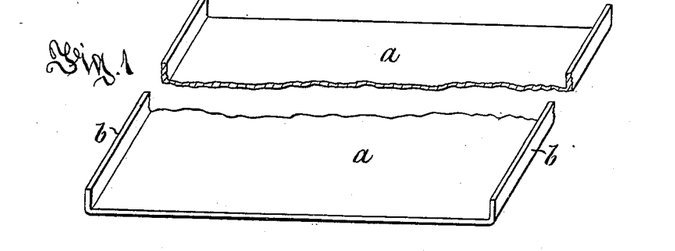
Figure 1 is a perspective view of a bar of steel out of which the spectacle-frames are made.
Figure 2:
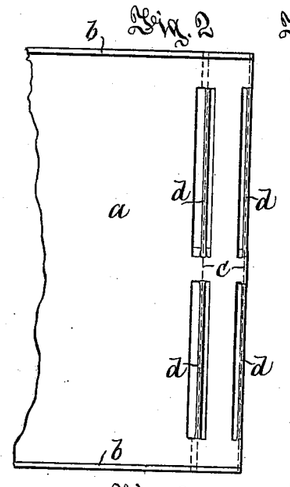
Fig. 2 is a plan of the same, showing transverse cuts by which a piece of the metal is fashioned and cut off from the bar to form the spectacle-frame.
Figure 3:
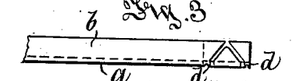
Fig. 3 is an end view of the same.
Figure 4:
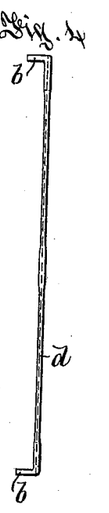
Fig. 4 is a side view of the cut-off piece.
Figure 5:
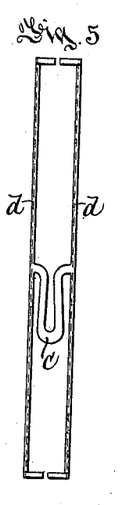
Fig. 5 is a plan showing the surplus part of the metal removed.
Figure 6:
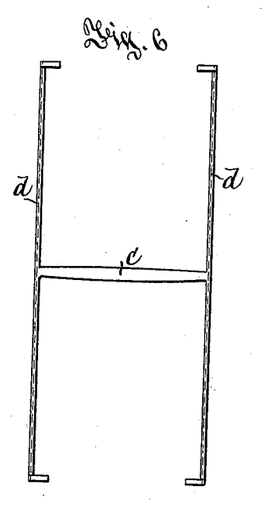
Fig. 6 shows the same with the central bridge or nose piece extended.
Figures 7, 8, 12, 13:
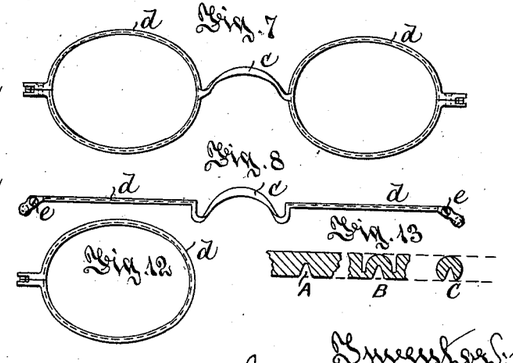
Fig. 7 shows a front view of the same bent to form the nosepiece and the frames for the lenses.
Fig. 8 is an edge view of Fig. 7.
Fig. 12 shows a single frame for the lens of an eyeglass.
Fig. 13 shows the result of the operations effected by the different milling-cutters.
Figure 8:
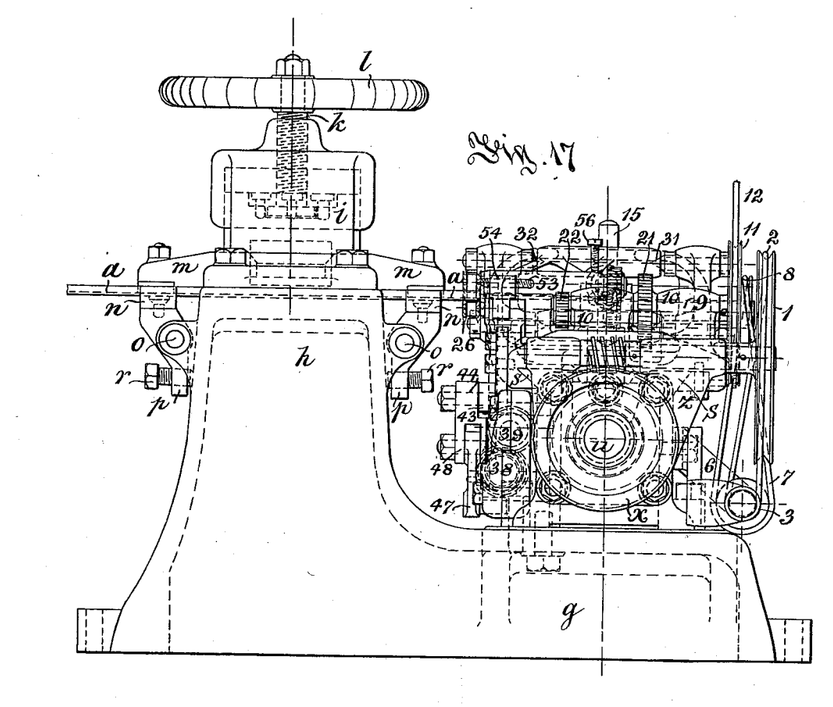
Figures 9, 10, 11:
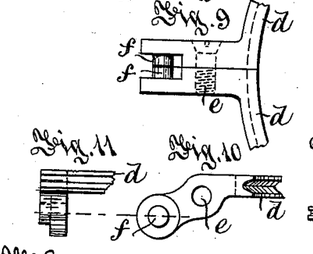
Fig. 9 shows on a larger scale, in plan, the junction of the ends of the lens-frame and the pins for the side or "temple.
" Fig. 10 shows a front view of the same.
Fig. 11 shows an end view (from the inside) of Fig. 10.
Figure 15:
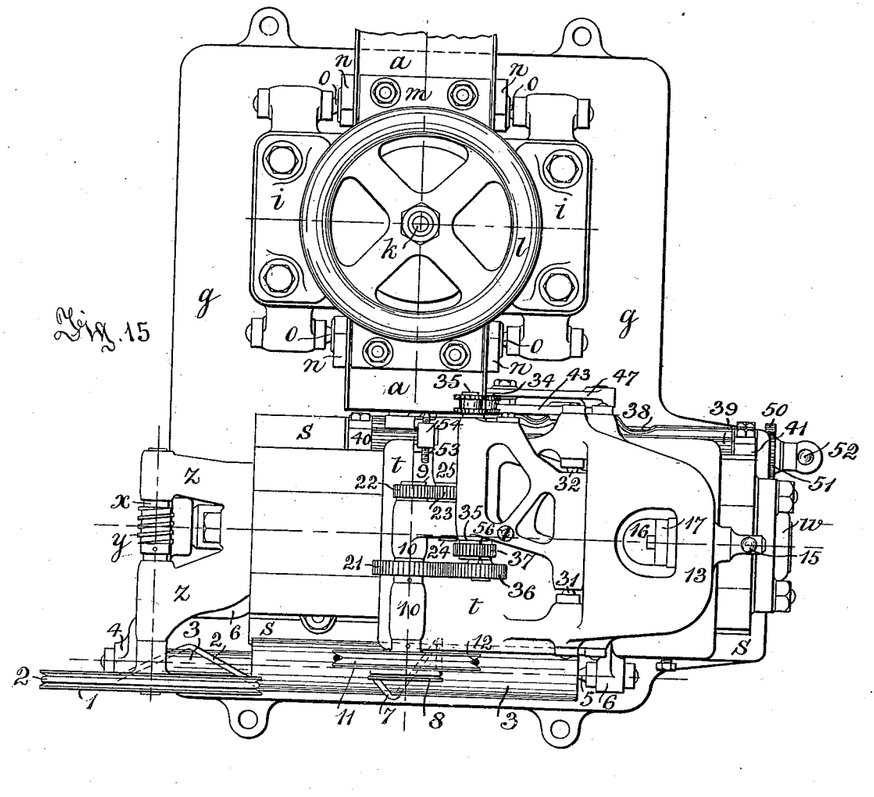
Fig. 15 is a plan of the same machine, and Fig. 16 a plan showing all the working parts in dotted lines.
Figure 16:
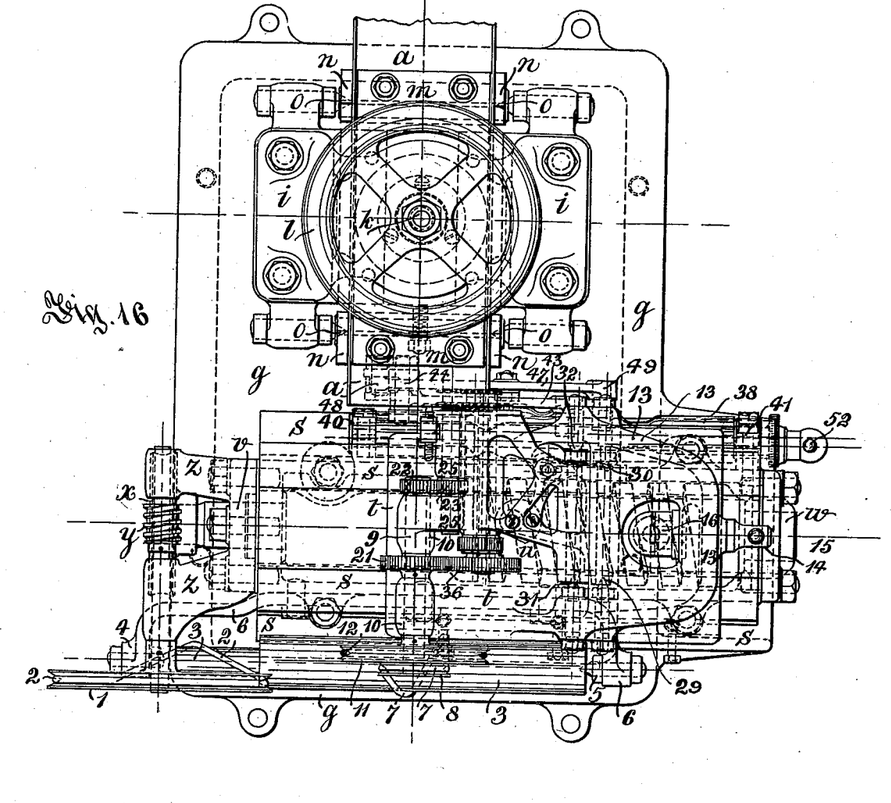

In Figs. 1 to 13, $a$ is a bar, of steel or other metal, from which the spectacle-frames are to be made. It is of channel shape in cross-section, as shown in Fig. 1, the turned-up flanges $b\ b$ serving to produce ultimately the lugs at each end of the eyes or lens-frames. From the end of the bar is cut off transversely a piece of the proper width, (shown in Fig. 5,) and the whole of the center part is cut away with the exception of a part $c$, which ultimately forms the bridge or nose piece of the spectacles and connects at their centers the two narrow side strips d d, which are of the same width as the thickness of the lens-frame. The end flanges forming the lugs are cut through diagonally, as shown at Fig. 3, so as to leave a triangular lug at each end of each of the sides d d. The lower side of the side strips d d has a V-shaped groove made in it from end to end, as shown on a larger scale in Fig. 10, to receive the edges of the lenses, (which are beveled to a less acute angle, so that they are firmly held in the grooves,) and the upper side of the strips d d, as well as the edges of the angular grooves, are rounded off, so as to lighten and improve the appearance of the spectacles. The frame being in the condition shown in Fig. 5, its central part is warmed sufficiently to enable the two sides d d to be separated from each other, the part c being stretched out, as shown in Fig. 6. The two side strips d d are then turned down at right angles and bent around into an elliptical shape to fit the lenses, as shown in Fig. 7, and the part c is bent and shaped to form the nosepiece, as shown in Figs. 7 and 8. When the sides have been bent around, as shown, the lugs at their ends come face to face and are screwed together, as shown on a larger scale in Fig. 9. Before the sides are bent around, however, the lugs are cut to the shape shown in Figs. 8, 9, 10, and 11, holes being made to receive the screw at e and the outer ends of the lugs being reduced to about half their thickness, leaving, however, a central pin standing up for the full thickness of the metal, as shown at f, so that when the two lugs are brought face to face and screwed together the ends of the pins f meet, as shown in Fig. 9, and they form together a pivot upon which the sides or temples of the spectacles turn. The reduction of thickness of the lugs leaving the pin standing is easily effected by the flat cutting end or face of a cylindrical rose-bit having a central opening of the same diameter as the pin.

Where a single eyeglass is to be used, as shown in Fig. 12, instead of a pair of spectacles a single strip d is cut from the bar a, having a lug at each end and an inner angular groove for the lens.

Spectacle-frames made in a single piece from a bar of channeled metal are very strong, simple, and quickly and cheaply made; but in order that very large quantities of such frames may be turned out I cut the frames from the channeled bar a by means of the machine shown in Figs. 14, 15, 16, and 17 of the drawings, in which g is a strong base which can be bolted to a foundation. h is a standard at one side of the base g, having its upper surface recessed and leveled to receive the channeled bar of metal a, which rests upon it and out of which spectacle-frames are to be cut, as already described. A strong bridge-piece i is bolted upon the standard h and carries a screw k and hand-wheel l, actuating a presser-foot m, the ends of which carry blocks which fit into the channel on the inner side of the bar a and hold the latter firmly while it is being worked.

Figure 35:
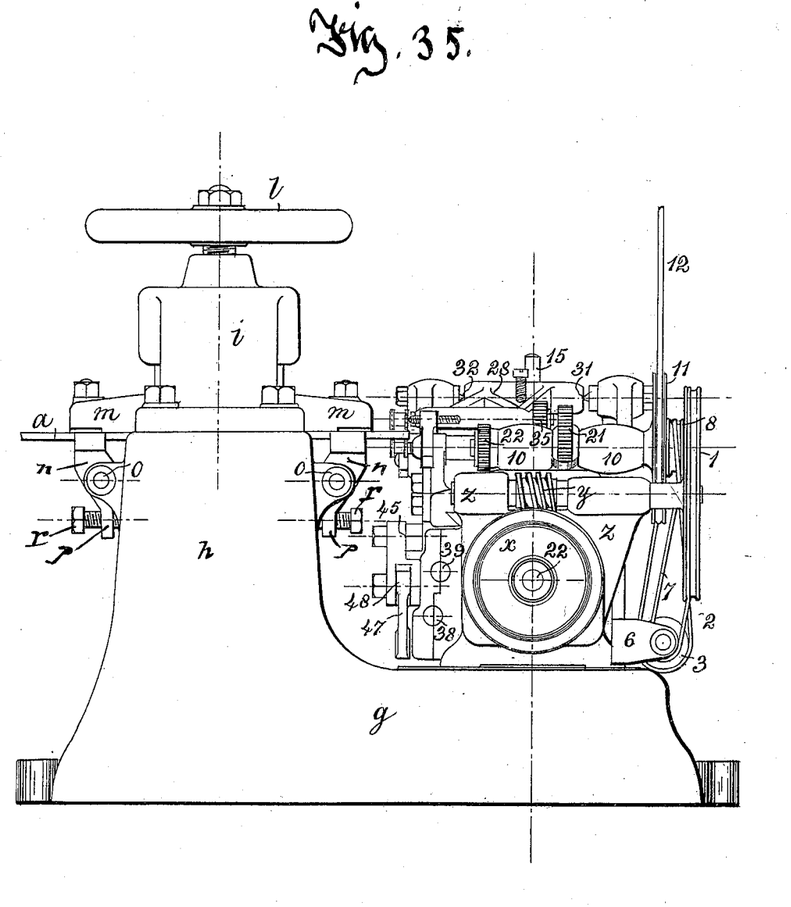
Fig. 35 is a view of the opposite end of the machine, said view being similar to Fig. 17, but without the dotted lines.
Figure 36:
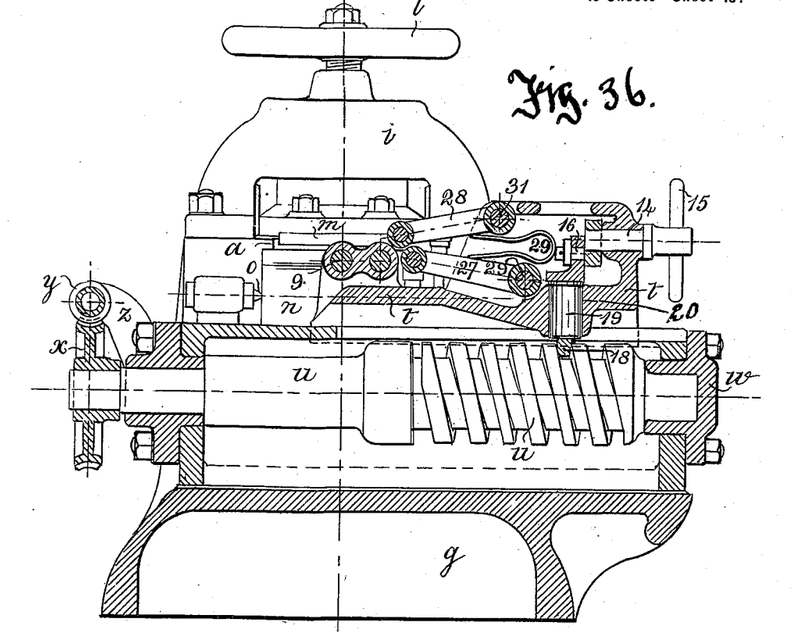
Fig. 36 is a vertical section through the line A B, Fig. 15, looking toward the top of the sheet.
Figure 37:
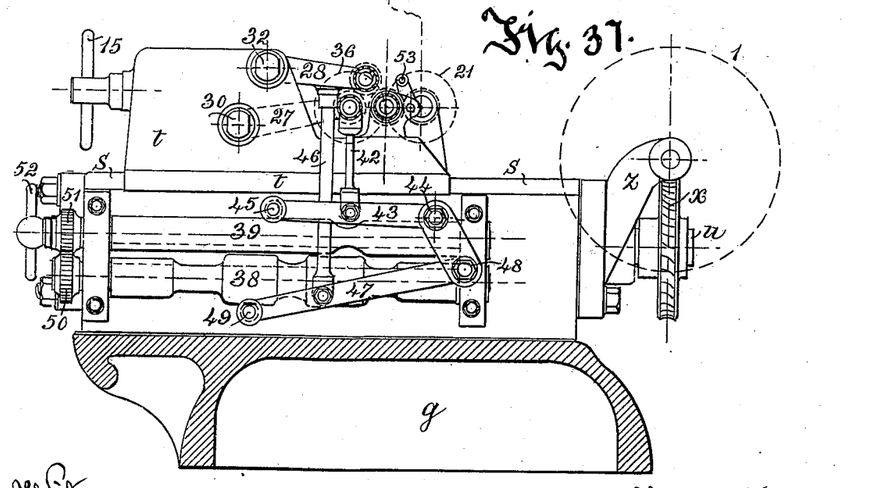
Fig. 37 is a vertical section through the line C D, Fig. 15, and looking down.

In order to accurately adjust the height and position of the channeled bar a, the latter rests upon slightly-cranked transverse supports n n under the pressure-blocks at the end of the presser-foot m. The supports n n are carried upon strong pivots o o upon the standard h, and they have downward prolongations p p, as seen in Figs. 17 and 35, through which pass screws r r, which press against the standard h and by turning which the exact adjustment of the supports n n and the exact position of the channeled bar a can be fixed. The free end of the channeled bar a overhangs the support and is operated upon by transversely-moving circular milling-cutters mounted upon a sliding carriage t. s is a hollow transverse slide-bed resembling the bed of an ordinary lathe, on which slides a carriage t, having guides readily adjustable upon the bed. The carriage t is made to traverse upon the slides on the bed s by means of a strong screw u, the ends of which turn in bearings at v and w in the ends of the bed s, upon which the carriage t slides. The outer end of the screw-shaft projects through its bearing v and has fixed upon it a tangent toothed wheel x, gearing with and driven by a screw y, which turns in bearings in a bracket z, bolted to the end of the bed s. One end of the axis of the screw y is fitted with a pulley 1, which is made to revolve slowly by an endless cord 2, passing around it and also shown passing around one end of a cylinder or drum 3 of small diameter arranged across the end of the base g and turning freely on adjustable bearings 4 and 5 in a bracket 6, bolted to the bed s. The other end of the cylinder or drum 3 is of larger diameter and is shown set in revolution by an endless cord 7, passing around it and around a corresponding driving-pulley 8 upon the end of the principal driving shaft or spindle 9 of the machine, which turns in bearings 10 upon the carriage t at right angles to the direction of movement of the carriage on its bed. The driving-shaft 9 is driven by a pulley 11 and an endless cord 12 from a driving-pulley at a sufficient distance above the machine, (not shown in the drawings, but set in revolution by any convenient power,) the length of the larger part of the cylinder or drum 3 allowing the endless cord 7 to pass along it as the carriage t moves along upon its slide.

At the back end of the carriage t is a bracket 13, having a horizontal cylindrical hole or bearing through it, in which turns a spindle 14, upon the outer end of which is fixed a handle 15, while at its other end is fixed a crank-pin 16, which actuates, by means of a slot 17, in which the pin fits, a tooth 18 upon the lower end of a bar 19, fitting and working in a guide 20, so that the tooth 18 can be introduced between or withdrawn from the threads of the screw u by turning the handle 15, the carriage *t* being fed forward by the screw *u* or instantly stopped, as desired. The driving-shaft 9, turning in the bearings 10 upon the carriage *t* and set in revolution by the pulley 11 and endless cord 12, as already described, carries near the middle of its length between the bearings 10 a toothed wheel 21 and at its inner end a smaller toothed wheel 22, which gears with and drives a corresponding toothed wheel 23, fixed upon a spindle 24, turning in bearings 25 upon the carriage *t*. The outer end of the spindle 24 has fixed upon it a double milling-cutter 26, (shown on a larger scale in Fig. 24,) having two parallel sets of V-shaped cutting-teeth. The position of the spindle 24 and cutters 26 is such that when they are in revolution and the carriage *t* is fed forward upon its slide by the screw *u* the cutters cut two parallel transverse grooves across the lower side of the projecting end of the channeled bar *a*, as described above and illustrated in Figs. 2, 3, 4, 5, 6, 9, 10, and 11 and on a larger scale in transverse section at A in Fig. 13.

27 and 28 are arms or frames (shown on a larger scale in Figs. 26 and 28) pivoted at one of their ends upon accurately-adjustable centers upon the carriage *t*. The lower one, 27, is pivoted at 29 30 in a nearly-horizontal position below the level of the bar *a*, which is to be operated upon, while the upper one, 28, is pivoted at 31 32 in a nearly-horizontal position above the level of the bar *a*, and the two arms or frames are pressed apart, the upper one, 28, upward and the lower one, 27, downward by a spring 33. The free end of the upper arm 28 is not directly above that of the lower arm 27, but somewhat in advance of it, for a reason which will be explained presently. The arms or frames 27 and 28 are made of the shape shown in plan, so that while the pivots upon which they turn are conveniently situated upon the carriage *t* their outer ends are brought close to the position where the milling-cutters are to act upon the channeled bar *a*. These outer ends form bearings to receive freely-revolving spindles 34 35, at one end of each of which are fixed double milling-cutters, the cutting-teeth of which are of the shape shown on an enlarged scale in Fig. 25, their cutting edges being concave or U-shaped instead of being pointed or V-shaped, as is the case with the teeth of the first cutter already described, and shown in Fig. 24. The position of the concave teeth of these two double cutters is carefully adjusted, so that they are exactly in alinement with the teeth of the cutters 26. At the outer end of the lower spindle 34 is fixed a toothed wheel 36, corresponding and gearing with the toothed wheel 21 upon the driving-spindle 9, the teeth of the wheels being of sufficient depth and of such shape as to allow the spindle 34 to be raised or lowered through a short distance without affecting their proper working. Upon the same lower spindle 34 is also fixed a small toothed wheel 37, gearing with a similar toothed wheel fixed upon the upper spindle 35.

If when the machine is in action the carriage *t* is fed forward, the lower cutter commences to cut two parallel transverse V-shaped grooves across the lower flat side of the channeled bar *a* of the shape shown on an enlarged scale at A, Fig. 13. The upper cutter then comes into operation and cuts grooves from above at each side of the lower V-shaped groove on the upper face of the channel *a*, at the same time rounding the upper edges of the metal lying immediately over the V-shaped groove, as illustrated at B, Fig. 13. The lower cutter finally comes into operation, cutting similar lateral grooves from below coinciding with and meeting those from above and at the same time rounding the sides and edges of the V-shaped groove, so that the strip of metal separated has the form of a more or less circular wire having a longitudinal V-shaped groove along its lower edge, as shown at C, Fig. 13. The upper cutter being somewhat in advance of the lower one, their cutting-teeth do not interfere with each other.

Referring to Figs. 2, 3, 5, and 6 and to what has already been explained, it is evident that while the lower V-shaped cutter can cut its grooves completely across the channeled bar *a* the other two cutters must be removed from the bar *a* at the part where the nosepiece *c* joins the parts *d* and must also leave the parts adjoining the flanges *b b*. In order to effect this, I cause the lower spindle 34, with its cutter, and the upper spindle 35, with its cutter, to be normally kept separate by the spring 33 sufficiently to prevent them from acting upon the bar *a*, the upper cutter being brought down and the lower cutter raised, when necessary, to bring them into action by means of cams.

Figures 18, 19, 20:
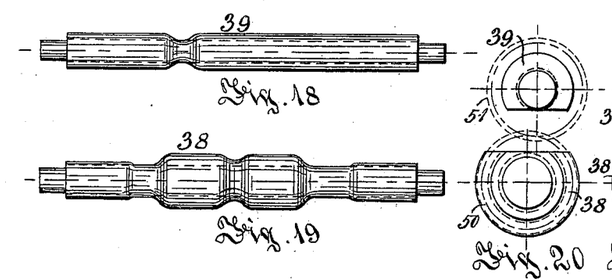
Fig. 18 is a side view of the upper cam-spindle.
Fig. 19 is a side view of the lower cam-spindle.
Fig. 20 is an end view, on a larger scale, of the two cam-spindles in their operative positions.
Figures 24, 25, 26, 27, 28, 29, 30, 31, 32:
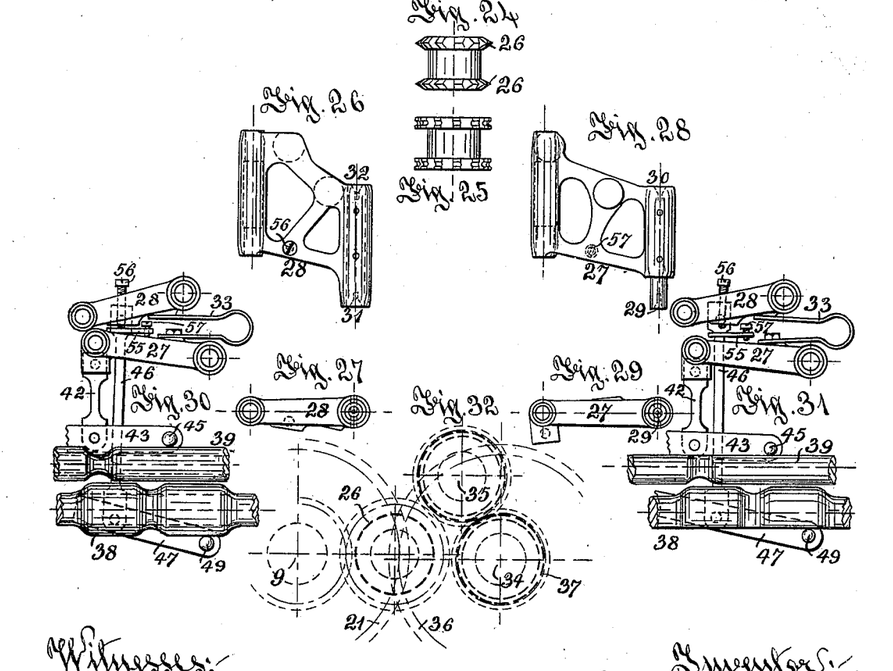
Fig. 24 is a plan of the lower grooving milling-cutter.
Fig. 25 is a plan of the upper and lower shaping milling-cutters.
Fig. 26 is a plan, on a smaller scale, of the pivoted arm carrying the upper shaping milling-cutter.
Fig. 27 is a similar side view of the same.
Fig. 28 is a similar plan of the pivoted arm carrying the lower shaping milling-cutter.
Fig. 29 is a similar side view of the same.
Fig. 30 is a similar side view showing the pivoted arms carrying the upper and lower shaping milling-cutters and the cam-spindles in their position when the cutters are in action.
Fig. 31 is a similar side view in the position when the cutters are out of action.
Fig. 32 shows in diagram form the relative positions of the milling-cutters and the toothed wheels which drive them when the cutters are in action.
Figure 33:
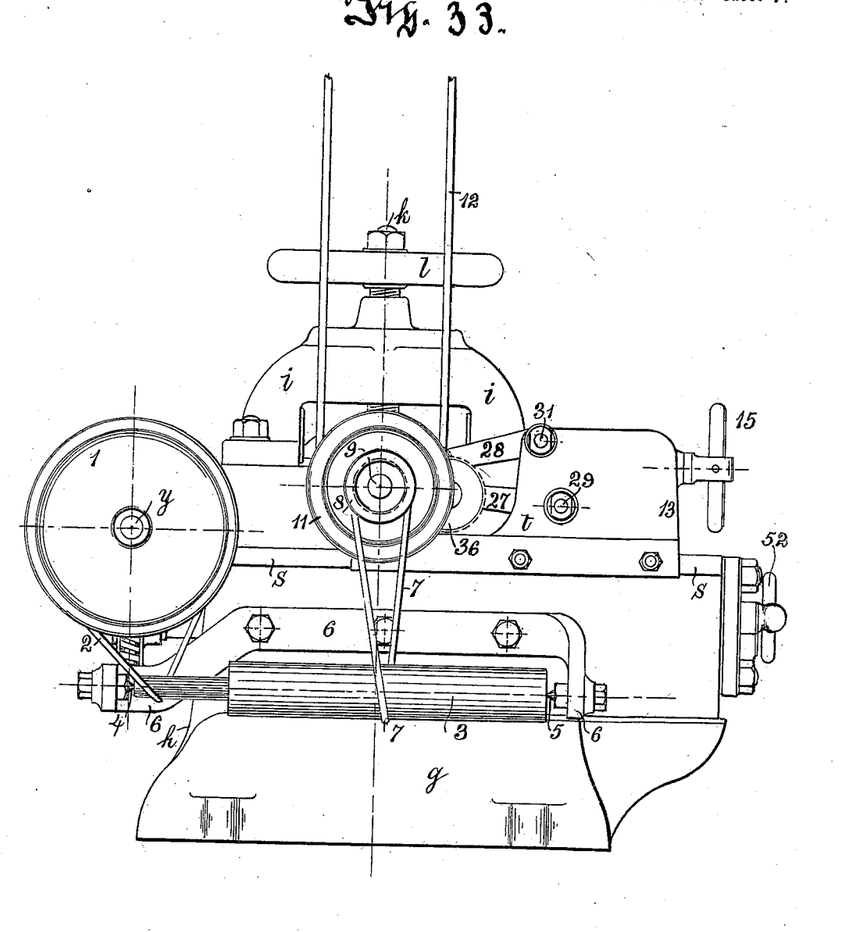
Fig. 33 is a front view similar to Fig. 14 with the dotted lines omitted.
Figure 34:
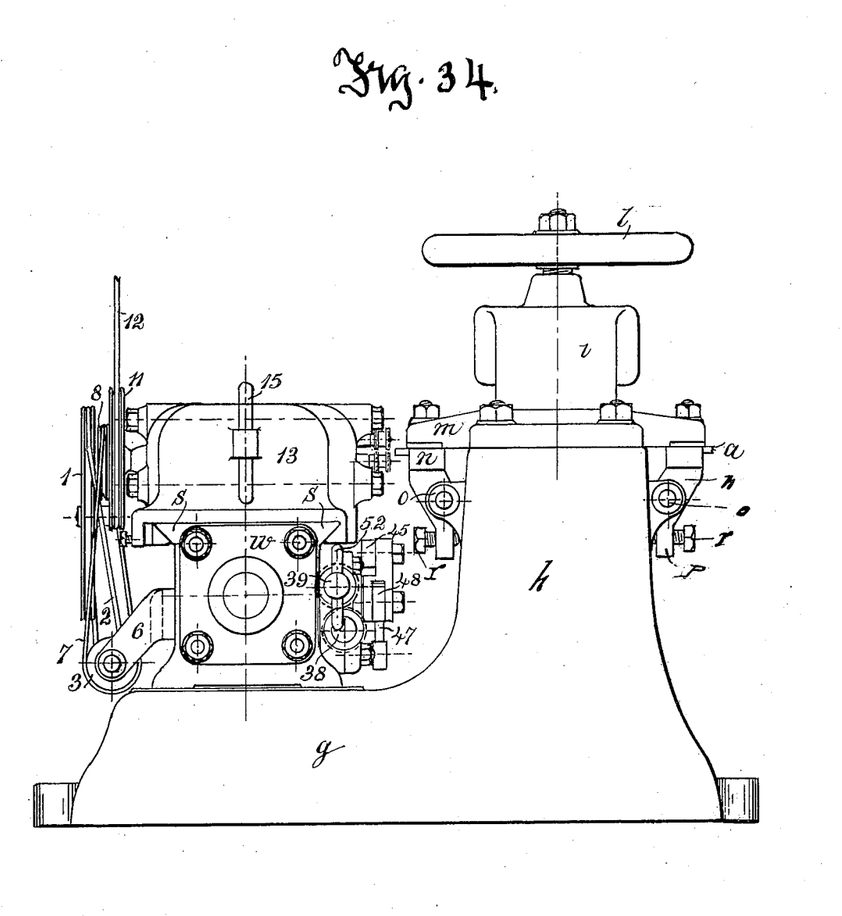
Fig. 34 is a view of one end of the machine, with the dotted lines omitted, as in Fig. 33.

Two cylindrical cams—that is to say, cylinders the peripheries of which are turned down to the special contour necessary for the operations which they have to effect—are shown separately in Figs. 18 and 19, in which 38 represents the lower cam, which influences the upper pivoted arm 28 and spindle and cutter 35, and 39 the upper cam, which influences the lower pivoted arm 27 and spindle and cutter 34. The ends of these cam-spindles can turn in bearings 40 and 41 upon the transverse slide-bed *s*, to the side of which they are firmly supported one above the other and parallel to the central feeding-screw *u*, already described. The lower pivoted arm 27, carrying spindle and cutter 34, is connected by a connecting-rod 42 with a lever 43, which turns upon a center 44 in the carriage *t*, the lever being extended beyond the connecting-rod and its end provided with a lateral stud 45, which rests upon the upper side of the upper spindle-cam 39, against which it is pressed by the action of the spring 33. The upper pivoted arm 28, carrying the spindle and cutter 35, is similarly connected by a connecting-rod 46 with a second lever 47, which turns upon a center 48 in the carriage t, this lever being also extended beyond the connecting-rod 46 and its end being also provided with a lateral stud 49, which is kept pressed up against the lower side of the lower spindle-cam 38 by the action of the spring 33. This position is shown in Fig. 30, the upper and lower milling-cutters both being in operation upon the channeled plate a. When, as the carriage t passes along, the studs 45 and 49 arrive at parts of the cams 38 and 39 of reduced diameter, they are pressed into these parts by the action of the spring 33 and each milling-cutter is brought into and out of action as required, the cams being so formed that each cutter is automatically brought into and out of action exactly for the time and the depth required.

The centers 44 and 48 upon which the levers 43 47 are pivoted are carried by a frame turning upon the center 44 and which can be fixed in any position so that the center 48 can be adjusted in its position relative to the center 44.

Figures 22, 23:
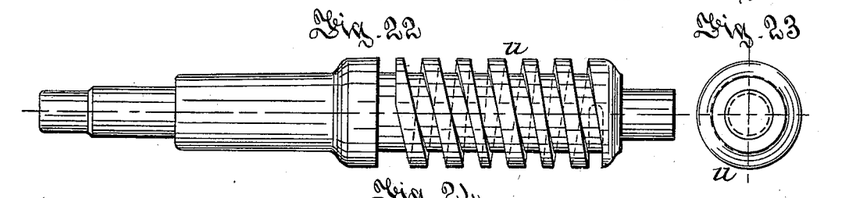
Fig. 22 is a side view of the screw actuating the milling-cutter carriage.
Fig. 23 is an end view of the same.

At the times when the milling-cutters first come into action after having been raised out of contact with the bar a it is advisable that the speed of feed forward of the carriage t should be reduced so that the cutters may come more gradually into action. For this purpose the pitch of the feeding-screw u is made somewhat finer at the parts of its length where the speed of the carriage requires to be so reduced. This alteration of pitch is illustrated in Fig. 22.

Figure 21:
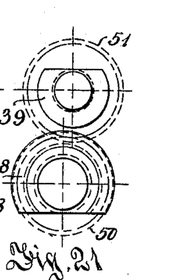
Fig. 21 is a similar view of the two cam-spindles in their inoperative positions.

In order that the carriage t may be moved backward and forward by hand when required, (the tooth 18 having been first withdrawn from between the threads of the feeding-screw u,) the spindle-cams 38 and 39 are coupled together at one end by toothed wheels of equal size, 50 51, one of the spindles being provided with a handle 52 by which they can be simultaneously turned half around. The two adjoining sides of the spindle-cams when the machine is at work are flattened from end to end, as shown on an enlarged scale in Figs. 20 and 21, and when they are turned half around, as shown in Figs. 21 and 31, their flat sides are outward and the studs 45 and 49 can pass along them, the milling-cutters being drawn out of action and not being affected by the cams.

In Figs. 15, 16, and 17, 53 is a small fine-threaded stop-screw which is screwed through a bracket 54, pivoted strongly upon the carriage t. When the bracket 54 is turned down upon its pivot, the point or end of the screw 53 is exactly opposite to the end of the channeled plate a, and it can be adjusted so that when the said plate is pushed forward against the screw it is exactly in the proper position to be operated upon by the different milling-cutters. When the bar a has been fixed, the bracket 54 and screw 53 can be turned upon the pivot, as shown in Fig. 17, so as to be out of the way.

In Figs. 14, 15, 16, 17, 30, and 31, 55 is a transverse plate fixed to the carriage t between the arms 27 and 28, serving as a stop, against which the arms are forced by the cams 38 and 39 when the milling-cutters are at work. For this purpose an adjustment-screw 56 is screwed through the upper arm 28, its point pressing against the stop 55, and 57 is a similar screw screwed through the stop 55 and limiting the movement of the lower arm 27. When the milling-cutters are at work, the arms which carry their spindles are in this way firmly held.

It is obvious that the method of causing the screw u to revolve in order to move the carriage t and the milling-cutters carried by it forward may be varied without affecting the essential parts of my invention. For instance, it may be turned by hand by an attendant.

Having now fully described my invention, what I claim, and desire to secure by Letters Patent, is—

1. The combination, in a machine for making spectacle-frames, of a base g, standard h, bridge-piece i, screw k, hand-wheel l, presser-foot m, pivoted supports n, adjusted by screws r, transverse slide-bed s, sliding carriage t, feed-screw u turning in bearings v, w, tangent toothed wheel x, endless screw y, turning in brackets z, pulley 1, cord 2, drum 3 turning in bearings 4, 5, in bracket 6, cord 7, pulley 8, driving-spindle 9 turning in bearings 10, driving-pulley 11, cord 12, bracket 13 having slot 17, spindle 14, handle 15, crank-pin 16, tooth 18, bar 19, and guide 20, toothed wheels 21, 22, 23, spindle 24, bearings 25, milling V-shaped cutter 26, frame 27 pivoted to carriage t at 29, 30, frame 28 pivoted to carriage t at 31, 32, spring 33 separating the pivoted frames, spindles 34, 35, turning in bearings in the pivoted frames, and carrying U-shaped milling-cutters, toothed wheel 36 gearing with wheel 21, toothed wheel 37 gearing with toothed wheel upon spindle 35, spindle-cams 38, 39, turning in lugs 40, 41, upon bed s, and having flattened sides, connecting-rod 42, lever 43 turning on center 44 in carriage t, and provided with stud 45, connecting-rod 46, lever 47 turning upon center 48, and provided with stud 49, toothed wheels 50, 51, coupling together the spindle-cams 38, 39, handle 52, stop-screw 53, pivoted bracket 54, fixed plate 55, and adjustment-screws 56, 57, all substantially as set forth.

2. The combination, in a machine for making spectacle-frames, of the transverse slide-bed s, sliding carriage t, feed-screw u, turning in bearings v, w, means for revolving the screw u, driving-spindle 9 turning in bearings 10, driving-pulley 11, cord 12, means for coupling and uncoupling the carriage t to the screw u, toothed wheels 21, 22, 23, spindle 24, bearings 25, milling V-shaped cutter 26, frame 27 pivoted to carriage t at 29, 30, frame 28 pivoted to carriage $t$ at 31, 32, spring 33, spindles 34, 35, turning in bearings in the pivoted frames 27, 28, and carrying U-shaped milling-cutters, toothed wheel 36 gearing with wheel 21, toothed wheel 37 gearing with toothed wheel upon spindle 35, spindle-cams 38, 39, turning in bearings 40, 41, upon bed $s$, and having flattened sides, connecting-rod 42, lever 43 turning on center 44 on carriage $t$, stud 45, connecting-rod 46, lever 47 turning on center 48, stud 49, toothed wheels 50, 51, coupling together the spindle-cams 38, 39, handle 52, and means for adjusting and firmly holding the channeled bar $a$ while it is being operated upon by the milling-cutters, substantially as set forth.

3. The combination, in a machine for making spectacle-frames, of the standard $h$, bridge-piece $i$, screw $k$, hand-wheel $l$, presser-foot $m$, pivoted support $n$ adjustable by screws $r$, substantially as and for the purpose set forth.

4. The combination, in a machine for making spectacle-frames, of the sliding carriage $t$, tooth 18, bar 19, crank-pin 16 and spindle 14; of the screw $u$, having threads of variable pitch, for feeding said carriage along its bed $s$ at a speed variable in different parts of its stroke, substantially as described.

5. The combination in a machine for making spectacle-frames, of the sliding carriage $t$, feed-screw $u$ and bearings therefor, worm-wheel $x$ carried by said screw, worm $y$ meshing therewith, spindle 9, pulley 1 mounted thereon, cord 2, drum 3 and bearings therefor, cord 7 running over said drum, pulley 8 over which said cord runs mounted upon said spindle, and driving-pulley 11 mounted on said spindle, substantially as and for the purposes described.

6. The combination in a machine for making spectacle-frames, of the feed-screw $u$ and stationary bearings therefor, worm-wheel $x$ carried by said screw, worm $y$ meshing therewith, bar 19 having a tooth 18 engaging said feed-screw, sliding carriage $t$ carrying said bar, and actuated thereby, spindle 14 having crank-pin 16 thereon, and means for turning said spindle and crank-pin to retract said bar from engagement with said feed-screw, substantially as and for the purposes described.

7. The combination in a machine for making spectacle-frames, of the feed-screw $u$ and stationary bearings therefor, worm-wheel $x$ carried by said screw, worm $y$ meshing therewith, bar 19 having a tooth 18 engaging said feed-screw, sliding carriage $t$ carrying said bar, and actuated thereby, spindle 14 having crank-pin 16 thereon, and means for turning said spindle and crank-pin to retract said bar from engagement with said feed-screw, toothed wheels 21, 22, 23, spindle 24 mounted in bearings 25, cutter 26, frame 27 pivoted to said carriage, frame 28 also pivoted to said carriage, spring 33 separating the pivoted frames, spindles turning in bearings in the said pivoted frames and carrying cutters, substantially as and for the purposes described.

8. The combination in a machine for making spectacle-frames, of the feed-screw $u$ and stationary bearings therefor, worm-wheel $x$ carried by said screw, worm $y$ meshing therewith, bar 19 having a tooth 18 engaging said feed-screw, sliding carriage $t$ carrying said bar, and actuated thereby, spindle 14 having crank-pin 16 thereon, and means for turning said spindle and crank-pin to retract said bar from engagement with said feed-screw, toothed wheels 21, 22, 23, spindle 24 mounted in bearings 25, cutter 26, frame 27 pivoted to said carriage, frame 28 also pivoted to said carriage, spring 33 separating the pivoted frames, spindles turning in bearings in the said pivoted frames and carrying cutters, toothed wheel 36 gearing with wheel 21, toothed wheel 37 gearing with toothed wheel upon one of the spindles in the said pivoted frames, spindle-cams 38 39 having flattened sides, connecting-rod 46, pivoted lever 47 to which said rod is connected, stud 49 on said pivoted lever, toothed gearing between the spindle-cams 38 39, and a stop-screw and handle for operating the same, substantially as and for the purposes described.

9. In a machine for making spectacle-frames, the combination with a clamping device for holding the bar from which said frames are to be made while being operated upon, a sliding carriage, means for feeding the said carriage transversely across the path of the said bar; means for controlling the feed on the said carriage at the will of the operator, spindle 24 mounted in said carriage, double cutter 26 mounted on said spindle, means for rotating said spindle, said cutters and spindle rotating beneath the plane of the said bar, spindles 34 and 35, the one mounted below and the other above the plane of the said bar; cutters having concave cutting edges mounted upon the said spindles, means operated by the machine for moving said cutters to vary the depth of their cut during their rotation, and a stop for setting the bar to be operated upon, substantially as described.

10. In a machine for making spectacle-frames, the combination with a clamping device for holding the bar from which said frames are to be made while being operated upon, means for adjusting the level of said bar, a sliding carriage, means for feeding the said carriage at a variable speed transversely across the path of the said bar; means for controlling the feed on the said carriage at the will of the operator, spindle 24 mounted in said carriage, double cutter 26 mounted on said spindle, means for rotating said spindle, said cutters and spindle rotating beneath the plane of the said bar, spindles 34 and 35, the one mounted below and the other above the plane of the said bar; cutters having concave cutting edges mounted upon the said spindles, means operated by the machine for moving said cutters to vary the depth of their cut during their rotation, and a stop for setting the bar to be operated upon, substantially as described.

11. In a machine for making spectacle-frames, the combination with a clamping device for holding the bar from which said frames are to be made while being operated upon, a sliding carriage, means for feeding the said carriage transversely across the path of the said bar; means for controlling the feed on the said carriage at the will of the operator, spindle 24 mounted in said carriage, double cutter 26 mounted on said spindle, means for rotating said spindle, said cutters and spindle rotating beneath the plane of the said bar, spindles 34 and 35, the one mounted below and the other above the plane of the said bar; cutters having concave cutting edges mounted upon the said spindles, means operated by the machine for moving said cutters to vary the depth of their cut during their rotation, consisting of jointed arms connected to the said cutter-spindles, springs acting upon the said arms, and cams also acting upon the said arms for giving to the spindles the desired movement, and a stop for setting the bar to be operated upon, substantially as described.

In testimony whereof I have hereunto affixed my signature in presence of two witnesses.

JAMES WEST.

Witnesses:
 SIDNEY W. ROWSELL,
 WM. O. BROWN.